Figure 1:
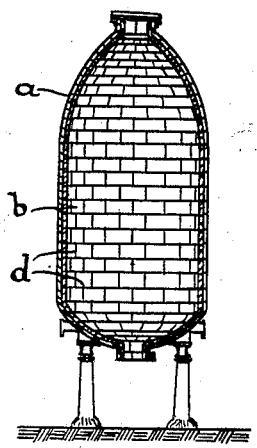
Figure 2:
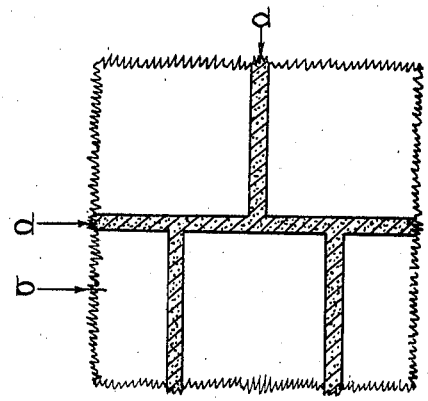

April 9, 1935.  K. DIETZ ET AL  1,996,859
ACIDPROOF MORTAR FOR LINING CELLULOSE DIGESTERS
AND A PROCESS OF LINING CELLULOSE DIGESTERS
Filed Jan. 27, 1933

INVENTORS:
Karl Dietz,
Karl Frank,
By Potter, Pierce + Scheffler, ATTORNEYS.

Patented Apr. 9, 1935

1,996,859

UNITED STATES PATENT OFFICE 1,996,859

ACIDPROOF MORTAR FOR LINING CELLULOSE DIGESTERS AND A PROCESS OF LINING CELLULOSE DIGESTERS

Karl Dietz, Frankfort-on-the-Main, and Karl Frank, Bad Soden in Taunus, Germany, assignors, by mesne assignments, to Pen-Chlor, Inc., Philadelphia, Pa., a corporation of Delaware Application January 27, 1933, Serial No. 653,930
In Germany February 5, 1932

9 Claims. (Cl. 92—7)

The present invention relates to acid-proof digesters and to an acid-proof mortar for lining cellulose digesters.

In cellulose digesters or apparatus containing cellulose lye with acid-proof bricks or tiles, acid-proof mortars are used for joining the bricks or tiles forming the lining of the digesters. These mortars are either water-glass cementing compositions or mixtures of cements and water-glass or mortars containing litharge which are prepared with water-glass or glycerin. Owing to the high thermal mechanical or chemical strong attacks to which all these mortars are exposed they last only for a relatively short time and soon soften, particularly at those points of the lining in the digesters which are exposed to a strong rinsing.

We have now found that there can be obtained absolutely stable linings which fully correspond to the afore-mentioned requirements by building up the linings by means of a mortar containing acid-proof filling materials, a phenol-aldehyde resin as binding agent and a substance having a condensing and hardening action on the phenol-aldehyde condensation product.

As the phenol-aldehyde condensation product has to act as a binding agent, it is used in a still liquid condition for the preparation of the mortar, for instance phenol-formaldehyde resin as Bakelite A.

The additions causing the condensation and hardening of the phenol-aldehyde resins may be of a neutral, basic or acid nature and need be present in the mortar only in relatively small quantities. Hardening in the cold is advantageous for setting the mortar. There are preferably used neutral additional substances, such as neutral metal oxides and aromatic sulfochlorides which in comparison to the acid additional substances have the advantage of being more readily worked and in comparison to the basic additional substances the advantage of possessing an improved resistance to acid. If there is used an additional substance which does not cause the phenol-aldehyde resin to harden in the cold, the mortar may be hardened with application of heat.

The usual acid-proof filling agents, such as pulverized quartz, silicon sinter, clay, pulverized asbestos, kieselguhr, silicon carbide, pulverized feldspar etc. are used for the preparation of the acid-proof mortar.

It was quite surprising that mortars prepared with the aid of artificial resins would correspond to the requirements in the digestion of wood, because a destruction of the artificial resin had to be expected owing to the high temperatures to which the mortars are exposed, to the attack of the calcium sulfite liquor used to disintegrate the wood incrustations (lignine and resins) and further to the combined attack of the natural resins dissolved in a large quantity out of the wood (liquid resins, i. e. waste products from the manufacture of cellulose from pine wood) together with the acid calcium sulfite liquor.

The following examples serve to illustrate the invention, but they are not intended to limit it thereto, the parts being by weight:

1. A mortar powder consisting of 90 parts of pulverized quartz and 10 parts of paratoluene-sulfochloride is mixed with 40 parts of a liquid artificial resin of phenol and aldehyde (Bakelite A) and used for lining cellulose digesters, expansion boilers or pulp pits with plates.

2. A mortar powder consisting of 90 parts of pulverized quartz and 10 parts of barium oxide is mixed with 40 parts of a liquid artificial resin of phenol and aldehyde (Bakelite A) and used as jointing mortar for linings in cellulose digesters or for plastering.

Instead of 10 parts of barium oxide there may be used 40 parts of lead oxide or 10 parts of sodium bisulfate. The mortar may also be hardened by the addition of an acid and the action of heat. Suitable acids are the inorganic acids, for instance hydrochloric acid, sulfuric acid or boric acid, and the strong organic acids, such as oxalic acid, chloroacetic acid.

In the attached drawing, cross-sections of digesters are shown to explain more fully our invention:

Fig. I shows the cross-section of a digester in which the acid-proof bricks indicated by the letter $b$ are arranged upon the steel shell $a$ in several layers. The joints of the layer of bricks indicated by the letter $d$ forming the lining of the interior surface of the vessel are filled in by the acid-proof mortar comprising an acid-proof artificial resin, as, for instance, a phenol-formaldehyde resin, and a hardening agent.

Fig. II shows the surface of the interior lining of the vessel, in which the joints between the bricks or tiles indicated by the letter $b$ are filled in with the acid-proof mortar indicated by the letter $d$.

We claim:

1. As a new acid-proof mortar for lining cellulose digesters the composition of matter which comprises an acid-proof filling agent, a liquid phenol-aldehyde condensation product and a substance capable of hardening and condensing the phenol-aldehyde resin.

2. As a new acid-proof mortar for lining cellulose digesters the composition of matter which comprises an acid-proof filling agent, a liquid phenol-formaldehyde resin and a substance capable of hardening and condensing the phenol-formaldehyde resin.

3. As a new acid-proof mortar for lining cellulose digesters the composition of matter which comprises finely pulverized quartz, a liquid phenol-formaldehyde resin and para-toluene-sulfochloride.

4. As a new acid-proof mortar for lining cellulose digesters the composition of matter which comprises finely pulverized quartz, a liquid phenol-formaldehyde resin and barium oxide.

5. An acid-resisting digester for the preparation of cellulose, comprising a digester shell acid-resisting building elements in said shell and a mortar by which the acid-resisting building elements are joined together, said mortar comprising a phenol-aldehyde resin.

6. An acid-resisting digester for the preparation of cellulose, comprising a digester shell acid-resisting building elements in said shell and a mortar by which the acid-resisting building elements are joined together, said mortar comprising a phenol-aldehyde resin and a substance capable of hardening the phenol-aldehyde resin.

7. An acid-resisting digester for the preparation of cellulose, comprising a digester shell acid-resisting building elements in said shell and a mortar by which the acid-resisting building elements are joined together, said mortar comprising a phenol-formaldehyde resin and a substance capable of hardening the phenol-formaldehyde resin.

8. An acid-resisting digester for the preparation of cellulose, comprising a digester shell acid-resisting building elements in said shell and a mortar by which the acid-resisting building elements are joined together, said mortar comprising pulverized quartz, a phenol-formaldehyde resin, and a para-toluene sulfochloride.

9. An acid-resisting digester for the preparation of cellulose, comprising a digester shell acid-resisting building elements in said shell and a mortar by which the acid-resisting building elements are joined together, said mortar comprising pulverized quartz, a phenol-formaldehyde resin, and barium oxide.

KARL DIETZ.
KARL FRANK.